US008973153B2

(12) United States Patent
Gilzean et al.

(10) Patent No.: US 8,973,153 B2
(45) Date of Patent: *Mar. 3, 2015

(54) CREATING AUDIO-BASED ANNOTATIONS FOR AUDIOBOOKS

(75) Inventors: Candice B. Gilzean, Cedar Park, TX (US); Gahlya J. Gregory, Bowling Green, KY (US); Fabian F. Morgan, Austin, TX (US); Michael Eric Rhodes, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 1403 days.

This patent is subject to a terminal disclaimer.

(21) Appl. No.: 12/413,890

(22) Filed: Mar. 30, 2009

(65) Prior Publication Data

US 2010/0251386 A1   Sep. 30, 2010

(51) Int. Cl.
G06F 17/00 (2006.01)
G06F 21/00 (2013.01)
G06F 21/10 (2013.01)

(52) U.S. Cl.
CPC ............ G06F 21/10 (2013.01); *Y10S 705/902* (2013.01); *Y10S 705/904* (2013.01)
USPC ...... 726/28; 726/4; 726/29; 726/30; 705/902; 705/904; 715/230; 715/233; 715/741

(58) Field of Classification Search
USPC .................. 726/26–30, 21, 1–7; 705/51, 54, 705/901–904, 59; 715/230, 741, 202, 233; 709/225, 229
See application file for complete search history.

(56) References Cited

U.S. PATENT DOCUMENTS

| | | | |
|---|---|---|---|
| 6,956,593 B1* | 10/2005 | Gupta et al. | 715/751 |
| 7,035,807 B1 | 4/2006 | Brittain et al. | |
| 7,257,774 B2* | 8/2007 | Denoue et al. | 715/719 |
| 8,151,358 B1* | 4/2012 | Herold | 726/27 |
| 2002/0099552 A1* | 7/2002 | Rubin et al. | 704/270 |
| 2003/0013073 A1* | 1/2003 | Duncan et al. | 434/317 |
| 2005/0071744 A1* | 3/2005 | Dunbar et al. | 715/500.1 |
| 2005/0102625 A1* | 5/2005 | Lee et al. | 715/727 |
| 2005/0182730 A1* | 8/2005 | Hunter et al. | 705/58 |
| 2005/0289453 A1* | 12/2005 | Segal et al. | 715/512 |
| 2006/0143560 A1* | 6/2006 | Gupta et al. | 715/512 |
| 2007/0118657 A1* | 5/2007 | Kreitzer et al. | 709/227 |
| 2007/0118853 A1* | 5/2007 | Kreitzer et al. | 725/46 |
| 2007/0168112 A1* | 7/2007 | Ratliff et al. | 701/200 |
| 2008/0005347 A1* | 1/2008 | Ott | 709/231 |
| 2008/0008458 A1* | 1/2008 | Gudipaty et al. | 386/131 |
| 2008/0046372 A1* | 2/2008 | Lutnick et al. | 705/51 |

(Continued)

OTHER PUBLICATIONS

Audible Book Annotations/ "Liner Notes" in iTunes, pp. 2-3, iLounge forums, iLounge.com, 2005.*

(Continued)

*Primary Examiner* — David García Cervetti
*Assistant Examiner* — Shanto M Abedin
(74) *Attorney, Agent, or Firm* — Yee & Associates, P.C.; Lisa J. Ulrich

(57) ABSTRACT

A computer implemented method, a data processing system, and a computer program publish an audio annotation of a media signal. A media player plays a media signal. The media player then records an audio annotation to the media signal. Responsive to recording the audio annotation to the media signal, the media player records an identifier to be associated with the media signal. The audio annotation is then published to a social networking host.

17 Claims, 5 Drawing Sheets

(56) References Cited

U.S. PATENT DOCUMENTS

| | | | |
|---|---|---|---|
| 2008/0267150 A1* | 10/2008 | Rofougaran | 370/338 |
| 2008/0276159 A1* | 11/2008 | Narayanaswami et al. | 715/202 |
| 2009/0019553 A1* | 1/2009 | Narayanaswami | 726/28 |
| 2009/0144325 A1* | 6/2009 | Chastagnol et al. | 707/104.1 |
| 2009/0295734 A1* | 12/2009 | Hendrickson et al. | 345/169 |
| 2009/0319885 A1* | 12/2009 | Amento et al. | 715/230 |
| 2010/0115596 A1* | 5/2010 | Horozov et al. | 726/7 |
| 2010/0169977 A1* | 7/2010 | Dasher et al. | 726/26 |

OTHER PUBLICATIONS

Audible Book Annotations/"Liner Notes" in iTunes, pp. 2-3, iLounge forums, iLounge.com, 2005.*

Nancy B. Vermylen, Book Publishing in the Age of the e-Book, HEINONLINE, 2002.*

Jana Bradley et al, Reframing Book Publishing in the Age of Networking, 2008.*

Audio Editor Pro v2.94, 1 page, retrieved Feb. 9, 2009, http://audioeditorpro.com/faq/join-audio-files.htm.

"iMovie for the Mac: Recording Your Voice and Editing an Audio Track—Learn how to record your voice and add a voiceover or commentary to your iMovie project",pp. 1-4, Interactive Media Center, retrieved Feb. 9, 2009 http://library.albany.edu/imc/tutav.htm.

"Software—Acc", pp. 1-4, retrieved Feb. 9, 2009 http://pcwin.com/software/Acc/index-1.htm.

"Microsoft Office OneNote 2003", pp. 1-2, retrieved Feb. 9, 2009 http://office.microsoft.com/training/training.aspx?Asst ID=RC011372221033.

McElhearn, "Organize PDF Files in iTunes", Kirkville, pp. 1-5, retrieved Feb. 9, 2009 http://mcelhearn.com/article.php?story=20041214092120119.

"Audio Book Annotations/"Linear Notes" in iTunes", iLounge, pp. 1-3 retrieved Feb. 9, 2009 http://forums.ilounge.com/showthread.php?s=&postid=445047.

\* cited by examiner

CREATING AUDIO-BASED ANNOTATIONS FOR AUDIOBOOKS

BACKGROUND OF THE INVENTION

1. Field of the Invention

The present invention relates generally to a computer implemented method, a data processing system, and a computer program product. More specifically, the present invention relates to a computer implemented method, a data processing system, and a computer program product for publishing an audio annotation of a media signal.

2. Description of the Related Art

With the various types of storage media and portable device players available today, audiobooks have become an increasingly popular alternative for "reading" books, especially when multitasking. However, as is sometimes the case when reading a book in the traditional way, a person may wish to record his or her thoughts about a section or mark a section for additional research later, when listening to an audiobook.

BRIEF SUMMARY OF THE INVENTION

According to one embodiment, a computer implemented method, a data processing system, and a computer program are provided for publishing audio annotations of a media signal. A media player plays a media signal. The media player then records an audio annotation to the media signal. Responsive to recording the audio annotation to the media signal, the media player records an identifier to be associated with the media signal. The audio annotation is then published to a social networking host.

DETAILED DESCRIPTION OF THE INVENTION

Figure 1:
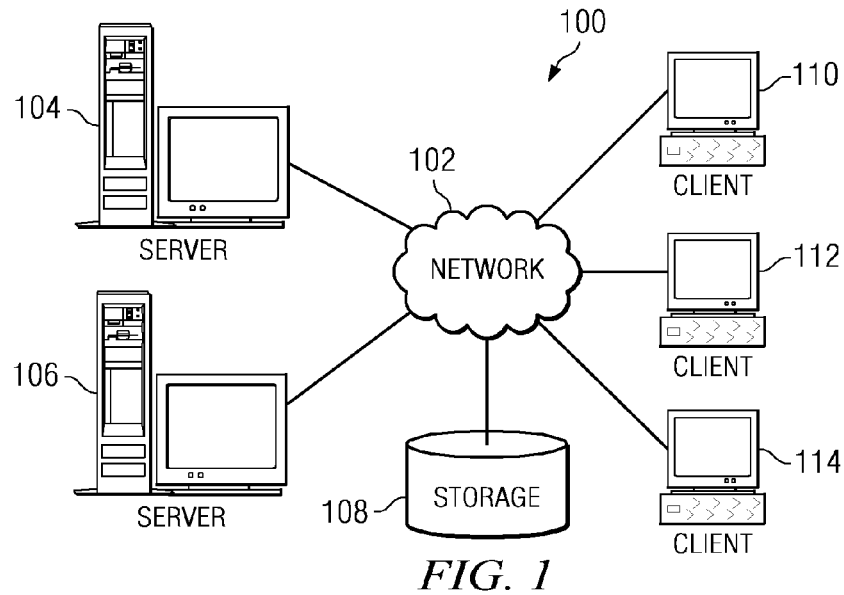
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
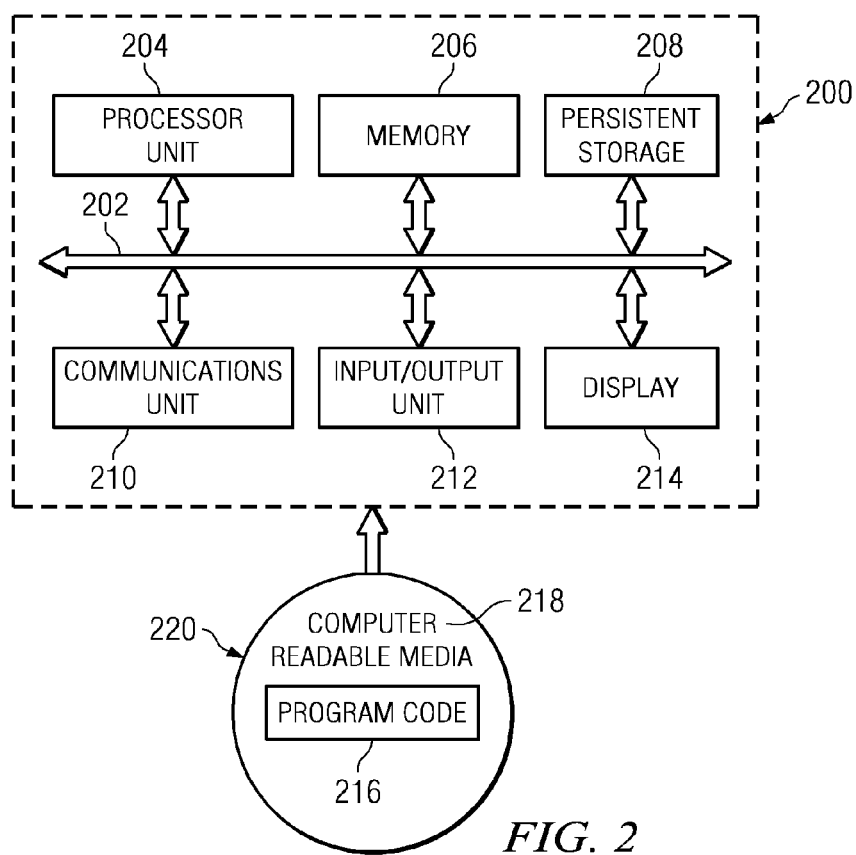
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a computer implemented method, a data processing system, and a computer program product for publishing an audio annotation of a media signal. A media player plays a media signal. The media player then records an audio annotation to the media signal. Responsive to recording the audio annotation to the media signal, the media player records an identifier to be associated with the media signal. The audio annotation is then published to a social networking host.

Figure 3:
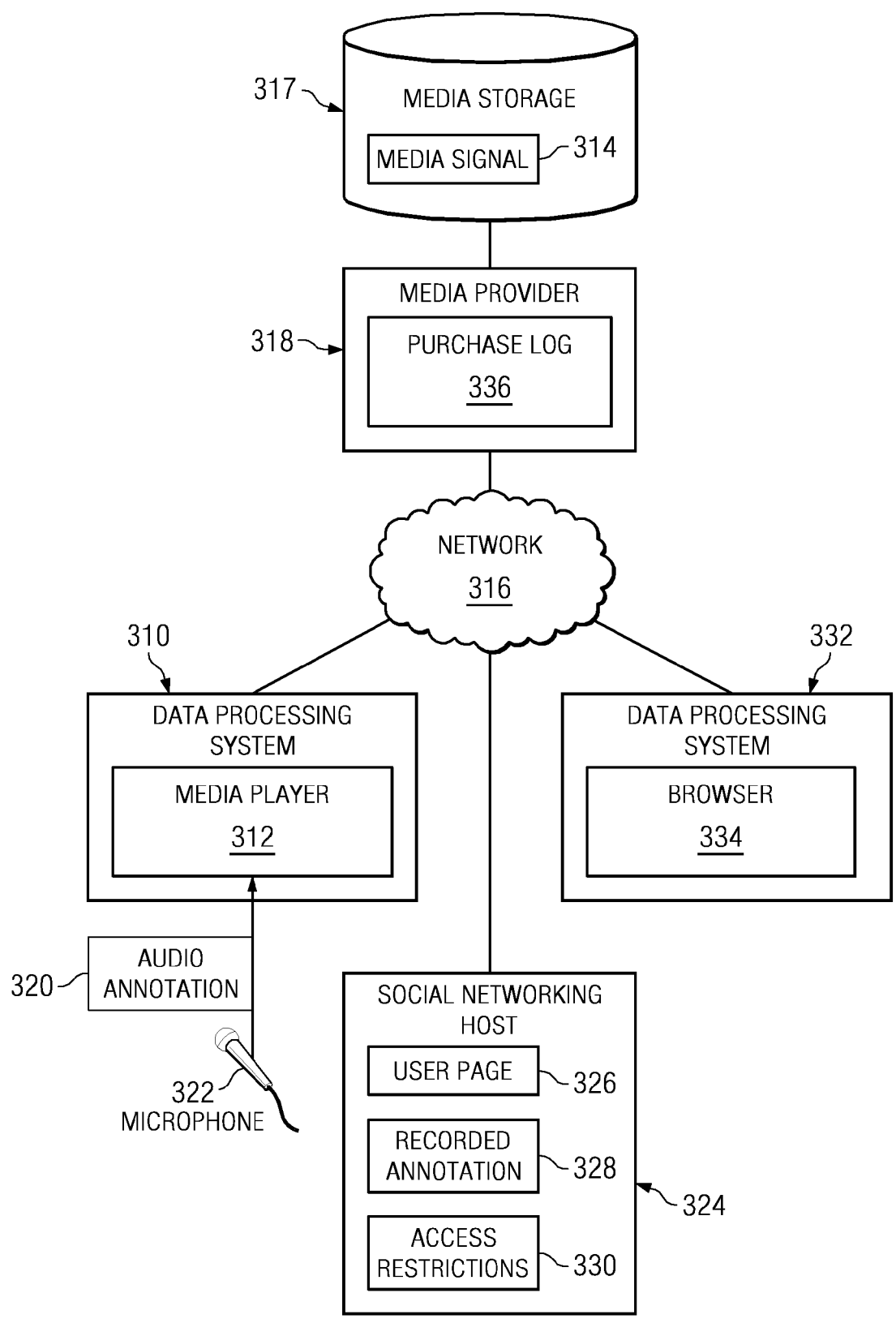
FIG. 3 is a dataflow for receiving user annotations of various media signals, and associating those annotations with certain portions of the media signal between the various components.

Referring now to FIG. 3, a dataflow is shown for receiving user annotations of various media signals, and associating those annotations with certain portions of the media signal between the various components. The data flow of FIG. 3 can be implemented within a network of data processing systems, such as network data processing system 100 of FIG. 1.

Data processing system 310 is a data processing system such as one of clients 110, 112, and 114 of FIG. 1. Data processing system 310 includes media player 312. Media player 312 is a software component that is capable of playing media signals, such as video and audio files. Media player 312 is also capable of receiving user annotations of the various media signals and associating those annotations with certain portions of the media signal.

Data processing system 310 accesses media signal 314 from network 316. Media signal 314 is a stored data containing information that can be received by data processing system 310, and can be presented to a user. Media signal 314 can be, for example, but is not limited to, a formatted audio signal, a formatted video signal, or a formatted audio-video signal. Media signal 314 can be an audio recording of a book, magazine, newspaper, or other printed media. Media signal 314 can also be a recording of a music composition, a motion picture, as well as recorded or live video footage. Media signal 314 is stored on media storage 317, which can be storage unit 108 of FIG. 1.

Data processing system 310 can access media signal 314 across network 316 from media provider 318. Media provider 318 can be any provider of electronic media. In one illustrative embodiment, media provider 318 is a commercial media provider, providing online or electronic media which can be purchased by a user. Such commercial media providers can be, for example, but are not limited to, iTunes Music Server® provided by Apple Computer, Inc; and Movielink.com, provided by Blockbuster, Inc.

A user of data processing system 310 can record audio annotation 320 to coincide with various sections of media signal 314. As the user views or listens to media signal 314, the user speaks audio annotation 320 into microphone 322. Media player 312 receives audio annotation 320 and corresponds audio annotation 320 to the recently played section of media signal 314. In one illustrative embodiment, media player 312 provides audio annotation 320 with a timestamp that corresponds to the recently played section of media signal 314. The timestamp provided to audio annotation 320 corresponds to a playtime, or elapsed time of media signal 314. By providing audio annotation 320 with a timestamp, other viewers of media signal 314 can determine the portions, scenes, or sections of media signal 314 to which audio annotation 320 is referring.

In one illustrative embodiment, audio annotation 320 can be converted into a text file, using a text to speech converter, which can be implemented in conjunction with media player 312. A statistical comparison of audio annotation 320 to a statistical database is performed in order to determine the probable text conversion. In one illustrative embodiment, audio annotation 320 is typically divided to frames, and each frame undergoes a short-time Fourier transformation, or other digital transformation, to create a spectral representation of audio annotation 320. Characteristics of the transformed audio annotation 320 are isolated from each of the signal frames, and compared to statistical models of known subject matter and performers to determine similarities using known statistical classification methods, such as K-nearest neighbor, Gaussian mixture modeling, support vector machines, vector quantization, hidden Markov modeling, and multivariate auto-regression modeling. From those models, a probable text can be determined.

A user of data processing system 310 can subsequently publish audio annotation 320 to social networking host 324. Social networking host is a network data processing system such as one of server 104 and server 106 of FIG. 1. Social networking host 324 can be, for example, but is not limited to, a server hosting a social networking website, such as Friendster, MySpace, or Facebook. Social networking host 324 can also be, for example, but is not limited to, a hosted or personal blog site of the user. The user publishes audio annotation 320 to user page 326 as recorded annotation 328.

In one illustrative embodiment, a user can set access restrictions 330 on recorded annotation 328. Access restrictions 330 determine what other users can access recorded annotation 328. In one illustrative embodiment, access restrictions 330 is a data structure containing a list of user names, wherein each of the user names correspond to users that have permission to access recorded annotation 328. In one illustrative embodiment, access restrictions 330 is a subset of the user's contact list, or friends list, maintained by social networking host 324. A user can select certain contacts from the contact list that are provided access to recorded annotation 328. In such an embodiment, social networking host 324 can flag, or otherwise indicate that those certain contacts from the contact list are provided access to recorded annotation 328.

In one illustrative embodiment, access restrictions 330 can be a password or personal identification number associated with the recorded annotation 328. A user is allowed access to recorded annotation 328 on successfully entering the password into a user interface.

Data processing system 332 is a data processing system, such as one of clients 110, 112, and 114 of FIG. 1. Data processing system 332 includes browser 334 which provides a second user access to social networking host 324. Browser 334 is a software application used to navigate or view information or data in a distributed database, such as the Internet or the World Wide Web. Browser 334 can include a graphical user interface that allows the second user to select various functions to facilitate navigation.

Browser 334 is used to navigate to a webpage for user page 326. The user at data processing system 332 can view, or obtain access to recorded annotation 328 if the user is indicated in access restrictions 330.

In one illustrative embodiment, social networking host 324 can interact with media provider 318 to determine whether the second user at data processing system 332 has a license to view media signal 314. Media signal 314 may be copyrighted, or otherwise access restricted material which is only shown to those users who have purchased a viewing license for media signal 314 from media provider 318. Social networking host 324 identifies the user from purchase log 336 of media provider 318.

Purchase log 336 is a data structure that associates users with purchased media signals, such as media signal 314. If purchase log 336 includes an association of the second user or data processing system 332 with media signal 314, then browser 334 can retrieve media signal 314 from media storage 317. Browser 334 can then be used to view media signal 314 in conjunction with recorded annotation 320. If purchase log 336 does not include an association of the second user or data processing system 332 with media signal 314, browser 334 can be redirected to media provider 318, so that the second user can obtain a license to view media signal 314. In the absence of obtaining a license to view media signal 314, browser 334 can be used to view recorded annotation 320 without viewing media signal 314.

Figure 4:
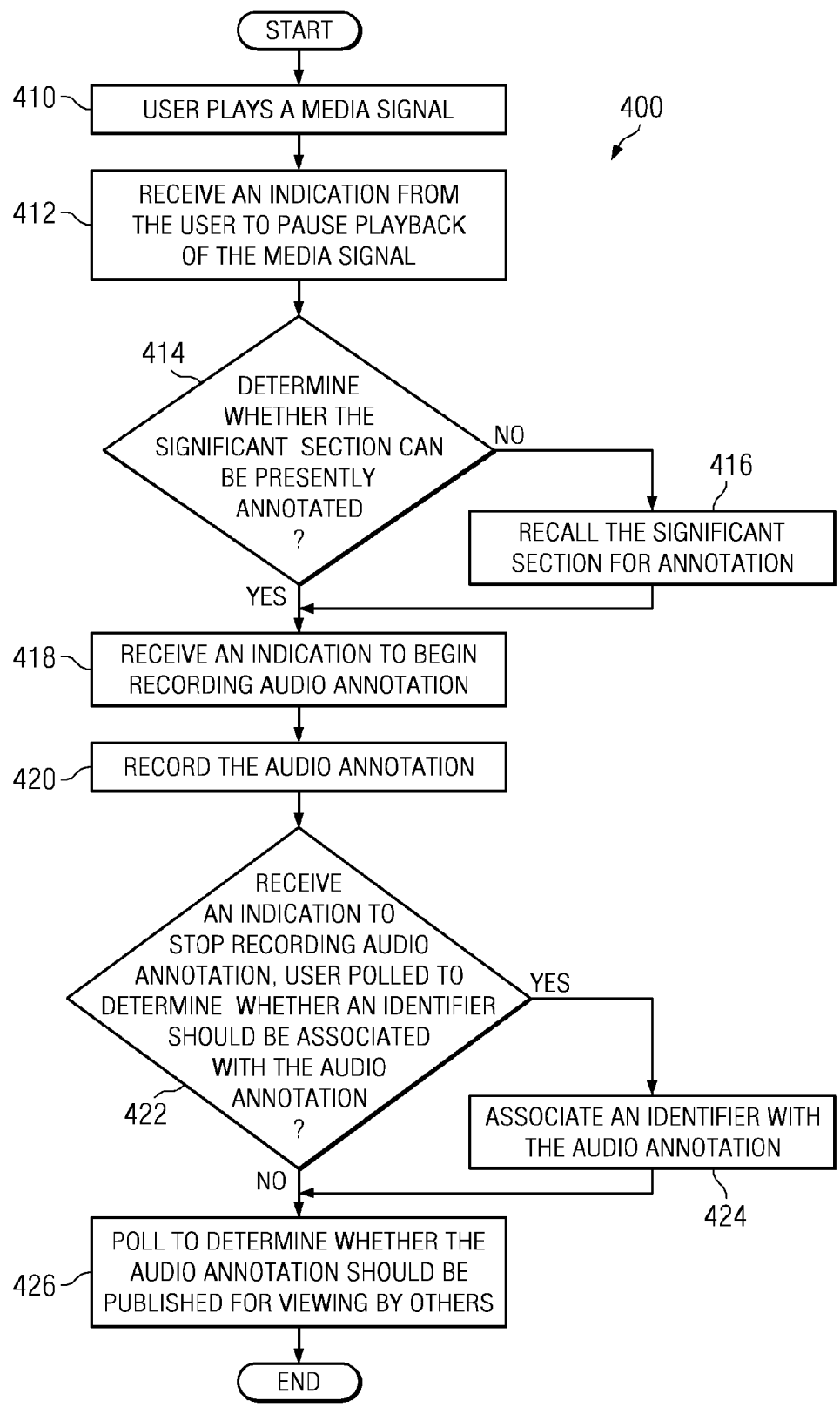
FIG. 4 is a flowchart of the processing steps for recording and publishing an audio annotation according to an illustrative embodiment.

Referring now to FIG. 4, a flowchart of the processing steps for recording and publishing an audio annotation is shown according to an illustrative embodiment. Process 400 is a software process, executing on a software component such as media player 312 of FIG. 3.

Process 400 begins when a user plays a media signal (step 410). The media signal can be, for example, but is not limited to, a formatted audio signal, a formatted video signal, or a formatted audio-video signal. The media signal can be an audio recording of a book, magazine, newspaper, or other printed media. The media signal can also be a recording of a music composition, a motion picture, as well as recorded or live video footage. The media signal can be media signal 314 of FIG. 3.

During the playback of the media signal, a particular section or passage in the media signal may elicit a particular thought by the user. The user may want to record this thought to share with others. Similarly, the user may wish to note the thought for the subject of possible further research, or to initiate discussion with others. Thus, responsive to viewing a significant section of the media signal, process 400 receives an indication from the user to pause playback of the media signal (step 412).

Process 400 then determines whether the significant section can be presently annotated (step 414), or whether the media signal should be recalled or "rewound" to the significant section. If the significant section cannot be presently annotated ("no" at step 414), process 400 recalls the significant section for annotation (step 416). If the significant section can be presently annotated ("yes" at step 414), process 400 proceeds to step 418.

Process 400 then receives an indication to begin recording audio annotation (step 418). In one illustrative embodiment, the user provides an indication to begin recording audio annotation by interacting with a user interface, such as selecting from a menu, or clicking an icon from a graphical user interface.

Responsive to receiving an indication to begin recording audio annotation, process 400 records the audio annotation (step 420). The audio annotation can be audio annotation 320 of FIG. 3.

Process 400 then receives an indication to stop recording audio annotation (step 422). In one illustrative embodiment, the user provides an indication to stop recording audio annotation by interacting with a user interface, such as by selecting from a menu, or clicking an icon from a graphical user interface.

Responsive to receiving an indication to stop recording audio annotation, process 400 polls the user whether an identifier should be associated with the audio annotation (step 422). Responsive to identifying that an identifier should be associated with the audio annotation ("yes" at step 422), process 400 associates an identifier with the audio annotation (step 424). The identifier can be a timestamp that corresponds to the recently played section of media signal. The timestamp provided to the audio annotation corresponds to a playtime or elapsed time of the media signal. By providing the audio annotation with a timestamp, other viewers of the media signal can determine the portions, scenes, or sections of the media signal to which the audio annotation refers. Responsive to not identifying that an identifier should be associated with the audio annotation ("no" at step 422), process 400 proceeds to step 426.

Process 400 then polls the user whether the audio annotation should be published for viewing by others (step 426) with the process terminating thereafter. The audio annotation can be published to a social networking website, such as Friendster, MySpace, or Facebook. The audio annotation can similarly be published to a hosted or personal blog site of the user. The audio annotation can be published to social networking host 324 of FIG. 3. The user can then subsequently access the social networking website and set any desirable access restrictions, such as access restriction 330 of FIG. 3.

Figure 5:
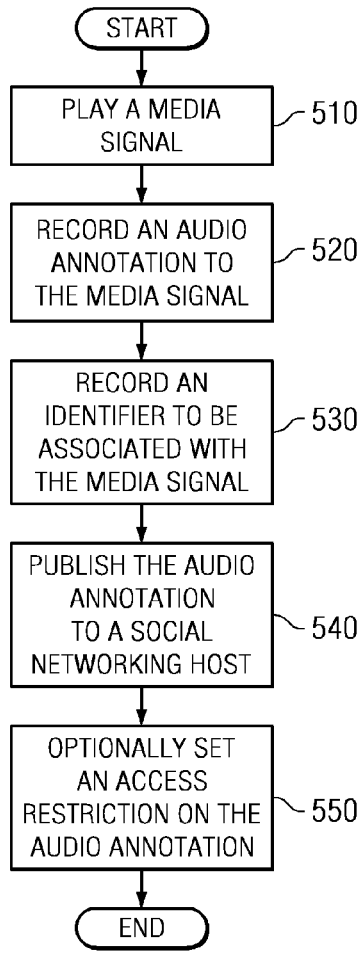
FIG. 5 is a flowchart of the processing steps for recording and publishing an audio annotation according to an illustrative embodiment.

Referring now to FIG. 5, a flowchart of the processing steps for recording and publishing an audio annotation is shown according to an illustrative embodiment. Process 500 is a software process, executing on a software component such as media player 312 of FIG. 3.

Process 500 begins by a playing a media signal (step 510). The media signal can be media signal 314 of FIG. 3.

Process 500 then records an audio annotation to the media signal (step 520). Audio annotation can be audio annotation 320 of FIG. 3. During the playback of the media signal, a particular section or passage in the media signal may elicit a particular thought by the user. The user may want to record this thought to share with others. The audio annotation can be a record of the user's thought.

Responsive to recording the audio annotation to the media signal, process 500 records an identifier to be associated with the media signal (step 530). The identifier can be a timestamp that corresponds to the recently played section of media signal. The timestamp provided to the audio annotation corresponds to a playtime or elapsed time of the media signal. By providing the audio annotation with a timestamp, other viewers of the media signal can determine the portions, scenes, or sections of the media signal to which the audio annotation refers.

Process 500 then publishes the audio annotation to a social networking host (step 540). The social networking host is a network data processing system such as one of server 104 and server 106 of FIG. 1. The social networking host can be, for example, but is not limited to, a server hosting a social networking website, such as Friendster, MySpace, or Facebook. The social networking host can also be, for example, but is not limited to, a hosted or personal blog site of the user.

Responsive to publishing the audio annotation to the social networking host, process 500 can optionally set an access restriction on the audio annotation (step 550), with the process terminating thereafter. The access restriction identifies other users that can access the recorded annotation from the social networking host.

Figure 6:
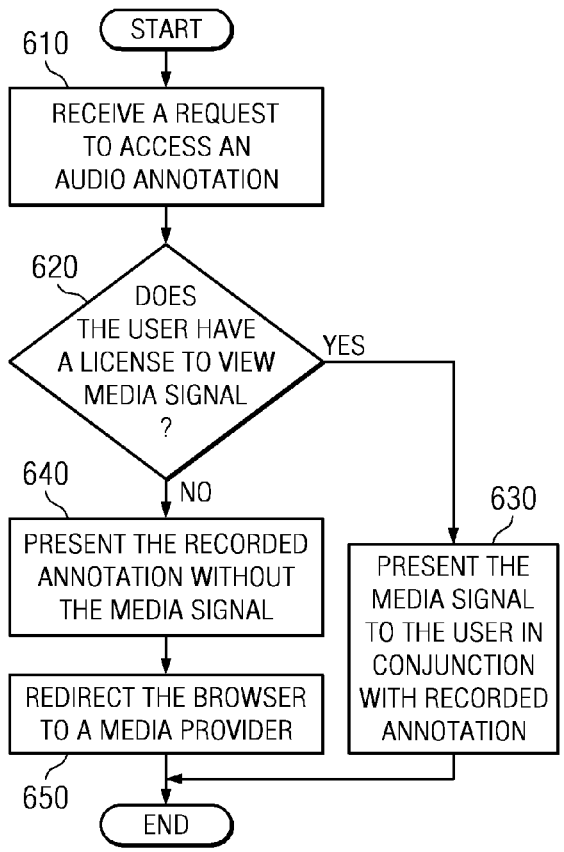
FIG. 6 is a flowchart of the processing steps for accessing a recorded audio annotation according to an illustrative embodiment.

Referring now to FIG. 6, a flowchart of the processing steps for accessing a recorded audio annotation is shown according to an illustrative embodiment. Process 600 is a software process, executing on a software component at social networking host 324 of FIG. 3.

Process 600 begins by receiving a request to access an audio annotation (step 610). The requested audio annotation can be recorded annotation 320 of FIG. 3. The audio annotation can be an audio annotation published to a social networking host. The request can be received from a browser, such as browser 334 of FIG. 3.

Responsive to receiving the request to access the audio annotation, process 600 identifies whether the user has a license to view media signal (step 620). Because the media signal may be copyrighted, or otherwise access restricted, owners of the media signal may only shown to those users who have purchased a viewing license for the media signal from a media provider. Process 600 therefore interacts with a media provider to determine whether the user has a license to view media signal. Process 600 can therefore attempt to identify the user from a purchase log of media provider.

Responsive to identifying that the user has a license to view media signal ("yes" at step 620), process 600 presents the media signal to the user in conjunction with recorded annotation (step 630), with the process terminating thereafter. The purchase log at the media provider includes an association of the user with media signal. Therefore, the process 600 allows the requesting browser to retrieve the media signal. The browser can then display both the media signal and the recorded annotation.

Returning now to step 620, responsive to identifying that the user does not have a license to view the media signal ("no" at step 620), process 600 presents the recorded annotation without the media signal (step 640). Process 600 can then redirect the browser to a media provider, so that the user of the browser can obtain a license to view the media signal (step 650), with the process terminating thereafter.

Figure 7:
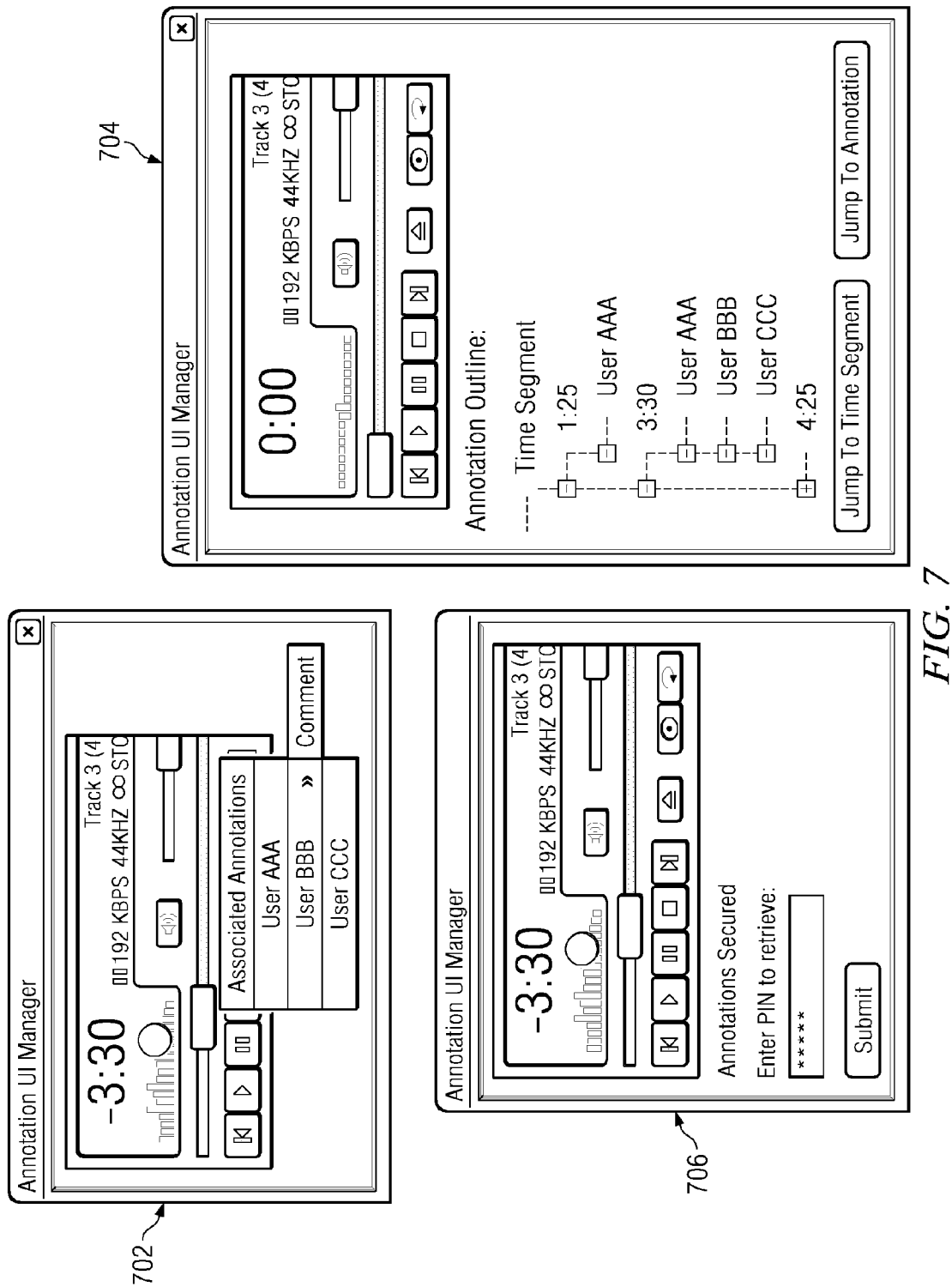
FIG. 7 is a series of screen shots for annotating various media signals and associating those annotations with certain portions of the media signal according to an illustrative embodiment.

Referring now to FIG. 7, a series of screen shots for annotating various media signals and associating those annotations with certain portions of the media signal is shown according to an illustrative embodiment. Screenshots 702, 704, and 706 show exemplary interaction with a graphical user interface of a software component, such as browser 334.

The graphical user interface of screenshot 702 displays all annotations that the user's contacts in a social network have added to a particular time segment of a played media signal. As the media signal is played, icons or indications for the annotations for a current time segment are displayed. The user can then select one of the icons or indications so that the associated annotation is played. Playback of the media signal is suspended during playback of the annotation.

The graphical user interface of screenshot 704 displays an outline of all annotations associated with a media signal. A user can select one of the annotations, and immediately jump to a particular segment of the media signal, and the annotations associated therewith.

The graphical user interface of screenshot 706 displays a prompting of a user to enter a PIN number associated with a particular audio annotation. The PIN number is a password allowing the user access to the particular audio annotation. The PIN number can be access restriction 330 of FIG. 3.

Figure 8:
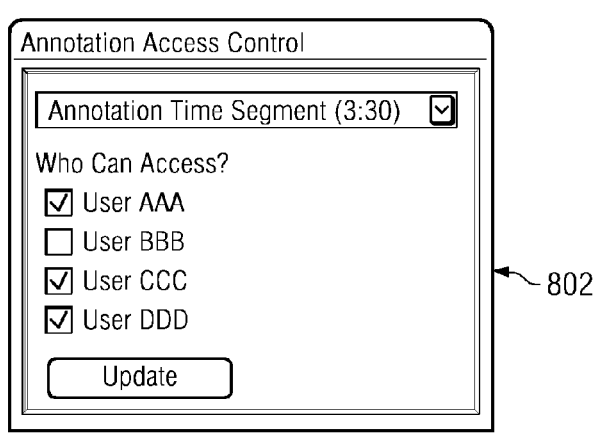
FIG. 8 is a screen shot for providing access to audio annotations of various media signals according to an illustrative embodiment.

Referring now to FIG. 8, a screen shot for providing access to audio annotations of various media signals is shown according to an illustrative embodiment. Screenshot 802 shows exemplary interaction with a graphical user interface of a software component, such as Media player 312.

The graphical user interface of screenshot 802 displays an access control. Utilizing the graphical user interface of screenshot 802, a user can determine which social network contacts have access to a particular annotation. In one illustrative embodiment, the user is thus providing access restrictions, such as access restrictions 330 of FIG. 3, to a subset of the user's contact list, or friends list, maintained by the social networking host, such as social networking host 324 of FIG. 3. The social networking host can flag or otherwise indicate that those certain contacts from the contact list are provided access to the recorded annotation.

Thus, the illustrative embodiments provide a computer implemented method, a data processing system, and a computer program product for publishing an audio annotation of a media signal. A media player plays a media signal. The media player then records an audio annotation to the media signal. Responsive to recording the audio annotation to the media signal, the media player records an identifier to be associated with the media signal. The audio annotation is then published to a social networking host.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for publishing an audible annotation to an audio signal, the method comprising the steps of:
   a computer audibly rendering the audio signal;
   the computer recording a human's audible annotation to the audio signal and electronically storing the audible annotation for access by a social networking host computer;
   subsequently, the social networking host computer receiving a request from another human at another computer to audibly render the audio signal with the audible annotation, and in response, audibly rendering the audible annotation in association with audible rendering of the audio signal at the another computer;
   responsive to receiving the request to audibly render the audio signal with the audible annotation, identifying whether the another human at the another computer has a license to view audio signal; and
   responsive to identifying that the another human at the another computer does not have a license to view the audio signal, presenting the audible annotation without the audio signal and redirecting the another computer to an audio media provider, so that the another human can obtain the license to audibly render the audio signal.

2. The method of claim 1, further comprising the steps of:
   responsive to storing the audible annotation for access by the social networking host computer, setting an access restriction to the audible annotation, wherein the access restriction identifies that the another human can access the audible annotation at the another computer.

3. The method of claim 1 further comprising the step of:
   in response to the computer recording the human's audible annotation to the audio signal, the computer recording a timestamp of a recently played section of the audio signal, and in response, corresponding the human's audible annotation to the recently played section of the audio signal.

4. The method of claim 1, further comprising the step of:
responsive to recording the human's audible annotation to the audio signal, the computer converting the human's audible annotation into a text file.

5. The method of claim 1, wherein the step of identifying whether the another human at the another computer has the license to view the audio signal further comprises:
responsive to receiving the request to audibly render the audio signal with the audible annotation, identifying whether the another human at the another computer has a license to view the audio signal by examining a purchase log of the another human on the social networking host computer.

6. The method of claim 1, wherein the audio signal is selected from the group consisting of: an audio recording of a book, an audio recording of a magazine, an audio recording of a newspaper, a recording of a music composition, a motion picture, recorded video footage, and live video footage.

7. A computer program product comprising a non-transitory computer-readable storage medium having computer readable program instructions stored on the non-transitory computer-readable storage medium to publish an audible annotation to an audio signal, the computer-readable program instructions, when executed by a CPU:
audibly render the audio signal;
record a human's audible annotation to the audio signal and electronically storing the audible annotation for access by a social networking host computer;
receive a request by the social networking host computer from another human at another computer to audibly render the audio signal with the audible annotation, and in response, audibly rendering the audible annotation in association with audible rendering of the audio signal at the another computer;
responsive to receiving the request to audibly render the audio signal with the audible annotation, identify whether the another human at the another computer has a license to view audio signal; and
responsive to identifying that the another human at the another computer does not have a license to view the audio signal, present the audible annotation without the audio signal and redirect the another computer to an audio media provider, so that the another human can obtain the license to audibly render the audio sign.

8. The computer program product of claim 7, further comprising computer readable program instructions which are stored on the non-transitory computer-readable storage medium and when executed by a CPU:
responsive to storing the audible annotation for access by the social networking host computer, set an access restriction to the audible annotation, wherein the access restriction identifies that the another human can access the audible annotation at the another computer.

9. The computer readable program product of claim 8, further comprising computer readable program instructions which are stored on the non-transitory computer-readable storage medium and when executed by a CPU:
in response to recording the human's audible annotation to the audio signal, record a timestamp of a recently played section of the audio signal, and in response, correspond the human's audible annotation to the recently played section of the audio signal.

10. The computer program product of claim 8, further comprising computer readable program instructions which are stored on the non-transitory computer-readable storage medium and when executed by the CPU:
responsive to recording the human's audible annotation to the audio signal, convert the human's audible annotation into a text file.

11. The computer program product of claim 7, wherein the computer readable program instructions for identifying whether the another human at the another computer has a license to view the audio signal further comprising computer readable program instructions which are stored on the non-transitory computer-readable storage medium and when executed by a CPU:
responsive to receiving the request to audibly render the audio signal with the audible annotation, identify whether the another human at the another computer has a license to view the audio signal by examining a purchase log of the another human on the social networking host computer.

12. The computer program product of claim 7, wherein the audio signal is selected from the group consisting of: an audio recording of a book, an audio recording of a magazine, an audio recording of a newspaper, a recording of a music composition, a motion picture, recorded video footage, and live video footage.

13. A computer system for publishing in audio annotation to an audio signal, the computer system comprising:
a CPU, a computer-readable memory and a computer-readable, tangible storage device;
program instructions, stored on the storage device for execution by the CPU via the memory, to audibly render the audio signal;
program instructions, stored on the storage device for execution by the CPU via the memory, to record a human's audible annotation to the audio signal and electronically storing the audible annotation for access by a social networking host computer;
program instructions, stored on the storage device for execution by the CPU via the memory, to receive a request by the social networking host computer from another human at another computer to audibly render the audio signal with the audible annotation, and in response, audibly rendering the audible annotation in association with audible rendering of the audio signal at the another computer;
program instructions, stored on the storage device for execution by the CPU via the memory, responsive to receiving the request to audibly render the audio signal with the audible annotation, to identify whether the another human at the another computer has a license to view audio signal; and
program instructions, stored on the storage device for execution by the CPU via the memory, responsive to identifying that the another human at the another computer does not have a license to view the audio signal, to present the audible annotation without the audio signal and to redirect the another computer to an audio media provider, so that the another human can obtain the license to audibly render the audio sign.

14. The computer system of claim 13 further comprising program instructions, stored on the storage device for execution by the CPU via the memory:
responsive to storing the audible annotation for access by the social networking host computer, to set an access restriction to the audible annotation, wherein the access restriction identifies that the another human can access the audible annotation at the another computer.

15. The computer system of claim 13 further comprising program instructions, stored on the storage device for execution by the CPU via the memory:

in response to recording the human's audible annotation to the audio signal, to record a timestamp of a recently played section of the audio signal, and in response, correspond the human's audible annotation to the recently played section of the audio signal.

16. The computer system of claim 13, wherein the program instructions to identify whether the another human at the another computer has the license to the view audio signal further comprise program instructions, stored on the storage device for execution by the CPU via the memory:

responsive to receiving the request to audibly render the audio signal with the audible annotation, to identify whether the another human at the another computer has a license to view the audio signal by examining a purchase log of the another human on the social networking host computer.

17. The computer system of claim 13, wherein the audio signal is selected from the group consisting of: an audio recording of a book, an audio recording of a magazine, an audio recording of a newspaper, a recording of a music composition, a motion picture, recorded video footage, and live video footage.

* * * * *